United States Patent
Gomez Angulo et al.

(10) Patent No.: US 11,108,155 B2
(45) Date of Patent: Aug. 31, 2021

(54) ELECTRONIC DEVICES HAVING DISTRIBUTED MILLIMETER WAVE ANTENNAS

(71) Applicant: Apple Inc., Cupertino, CA (US)

(72) Inventors: Rodney A. Gomez Angulo, Santa Clara, CA (US); Simone Paulotto, Redwood City, CA (US); Harish Rajagopalan, San Jose, CA (US); Jennifer M. Edwards, San Francisco, CA (US); Hao Xu, Cupertino, CA (US)

(73) Assignee: Apple Inc., Cupertino, CA (US)

(*) Notice: Subject to any disclaimer, the term of this patent is extended or adjusted under 35 U.S.C. 154(b) by 195 days.

(21) Appl. No.: 16/036,780

(22) Filed: Jul. 16, 2018

(65) Prior Publication Data

US 2020/0021025 A1    Jan. 16, 2020

(51) Int. Cl.
*H01Q 1/24* (2006.01)
*H01Q 5/35* (2015.01)
(Continued)

(52) U.S. Cl.
CPC ............ *H01Q 5/35* (2015.01); *H01Q 3/2617* (2013.01); *H01Q 3/38* (2013.01); *H01Q 5/50* (2015.01); *H04B 1/0458* (2013.01)

(58) Field of Classification Search
CPC .......... H01Q 5/35; H01Q 5/50; H01Q 3/2617; H01Q 3/38; H01Q 1/24; H01Q 1/38;
(Continued)

(56) References Cited

U.S. PATENT DOCUMENTS 7,812,775 B2 * 10/2010 Babakhani ........... H01Q 19/065
                                                                 343/754
8,795,082 B2    8/2014 Chen et al.
(Continued)

OTHER PUBLICATIONS

Emami, Sohrab, et al., "A 60GHz CMOS phased-array transceiver pair for multi-GB/s wireless communications", Solid-State Circuits Conference Digest of Technical Papers (ISSCC), 2011 IEEE International. IEEE, 2011.

(Continued)

*Primary Examiner* — Tho G Phan
(74) *Attorney, Agent, or Firm* — Treyz Law Group, P.C.; Michael H. Lyons; Tianyi He

(57) ABSTRACT

An electronic device may be provided with wireless circuitry for conveying radio-frequency signals greater than 10 GHz. The wireless circuitry may include a phased antenna array that transmits a steerable signal beam and independent antennas that are separate from the array. The array may be coupled to a first transceiver and the independent antennas may be coupled to a second transceiver. Power amplifier stages may be coupled between the second transceiver and the independent antennas to boost the gain of the independent antennas. If desired, the array and the independent antennas may be coupled to ports of the same transceiver. In this arrangement, each independent antenna may include an antenna feed that is coupled to a respective pair of ports on the transceiver. This may serve to boost the gain of the independent antennas without power amplifier circuitry. The independent antennas may have smaller footprints than the phased antenna array.

11 Claims, 7 Drawing Sheets

(51) Int. Cl.
*H01Q 9/04* (2006.01)
*H04B 1/00* (2006.01)
*H01Q 3/38* (2006.01)
*H01Q 3/26* (2006.01)
*H01Q 5/50* (2015.01)
*H04B 1/04* (2006.01)

(58) Field of Classification Search
CPC . H01Q 3/26; H01Q 1/243; H01Q 9/04; H04B 1/00; H04B 1/04; H04B 1/0458; H04B 1/18
USPC .......................................................... 343/702
See application file for complete search history.

(56) References Cited

U.S. PATENT DOCUMENTS

| | | | |
|---|---|---|---|
| 9,153,874 B2* | 10/2015 | Ouyang | H01Q 1/243 |
| 9,203,159 B2* | 12/2015 | Friedman | H01Q 21/065 |
| 9,343,817 B2 | 5/2016 | Pan | |
| 9,461,674 B2* | 10/2016 | Yarga | H01Q 1/2266 |
| 9,667,290 B2 | 5/2017 | Ouyang et al. | |
| 9,819,077 B1* | 11/2017 | Desclos | H01Q 5/328 |
| 10,263,332 B2* | 4/2019 | Yong | H01Q 1/38 |
| 10,361,476 B2* | 7/2019 | Ou | H01Q 1/243 |
| 10,680,332 B1* | 6/2020 | Li | H01Q 21/064 |
| 10,833,410 B2* | 11/2020 | Ayala Vazquez | H01Q 9/42 |
| 10,873,348 B2* | 12/2020 | Faraone | H04B 1/40 |
| 2006/0139210 A1* | 6/2006 | Stavros | H01Q 21/0025 343/700 MS |
| 2014/0203969 A1* | 7/2014 | Maltsev | H01Q 3/00 342/375 |
| 2014/0320344 A1* | 10/2014 | Sanderovich | H01Q 21/0025 342/372 |
| 2014/0329558 A1* | 11/2014 | Darnell | H04B 1/0458 455/553.1 |
| 2015/0116169 A1* | 4/2015 | Ying | H01Q 21/28 343/729 |
| 2018/0167130 A1 | 6/2018 | Vannucci | |

OTHER PUBLICATIONS

Natarajan, Arun, et al., "A 77-GHz phased-array transceiver with on-chip antennas in silicon: Transmitter and local LO-path phase shifting", IEEE Journal of Solid-State Circuits 41.12 (2006): 2807-2819.

* cited by examiner

ELECTRONIC DEVICES HAVING DISTRIBUTED MILLIMETER WAVE ANTENNAS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave communications signals generated by antennas can be characterized by substantial attenuation and/or distortion during signal propagation through various mediums. In addition, in compact electronic devices having limited available space for wireless communications circuitry, it can be difficult to provide coverage at millimeter and centimeter wave frequencies across all angles around the electronic device.

It would therefore be desirable to be able to provide electronic devices with improved wireless communications circuitry such as communications circuitry that supports millimeter and centimeter wave communications.

SUMMARY

An electronic device may be provided with wireless circuitry. The wireless circuitry may include one or more antennas and transceiver circuitry such as centimeter and millimeter wave transceiver circuitry (e.g., circuitry that transmits and receives antennas signals at frequencies greater than 10 GHz). The antennas may include antennas arranged in a phased antenna array and one or more independent antennas that are separated from the phased antenna array.

The phased antenna array may transmit radio-frequency signals within a steerable signal beam. In one suitable arrangement, the independent antennas may be formed separately from the phased antenna arrays in the device and may not contribute to beam formation or steering with any other antennas in the device. In another suitable arrangement, the independent antennas may transmit radio-frequency signals that form a part of the steerable signal beam (e.g., that constructively and destructively interfere with the radio-frequency signals transmitted by the phased antenna array to help steer the signal beam). In yet another suitable arrangement, the independent antennas may transmit radio-frequency signals that form part of an additional steerable signal beam (e.g., the independent antennas may form an additional phased antenna array).

If desired, the phased antenna array may be coupled to a first transceiver whereas the independent antennas are coupled to a second transceiver. Power amplifier stages may be coupled between the second transceiver and the independent antennas to boost the gain of the independent antennas (e.g., to compensate for over-the-air signal attenuation). In another suitable arrangement, the phased antenna array and the independent antennas may be coupled to ports of the same transceiver. In this arrangement, each independent antenna may include an antenna feed that is coupled to a respective pair of ports on the transceiver. This may serve to boost the gain of each of the independent antennas without power amplifier circuitry.

The independent antennas have a smaller footprint than the phased antenna array and can be placed at a greater variety of locations within the device. For example, the electronic device may include peripheral conductive housing structures and a display having a display cover layer mounted to the peripheral conductive housing structures at a front face of the device. The device may also include a dielectric rear housing wall at a rear face of the device. The phased antenna array may be mounted behind the dielectric rear housing wall and may transmit the steerable signal beam through the dielectric rear housing wall. The display may include an active area that emits light through the display cover layer. The display may include an inactive area interposed between the active area and the peripheral conductive housing structures. One or more of the independent antennas may be aligned with the inactive area and may transmit radio-frequency signals through the display cover layer. In this way, the antennas may provide millimeter and centimeter wave coverage with sufficient gain across as an great area as possible around the device despite space constraints within the device.

DETAILED DESCRIPTION

Figure 1:
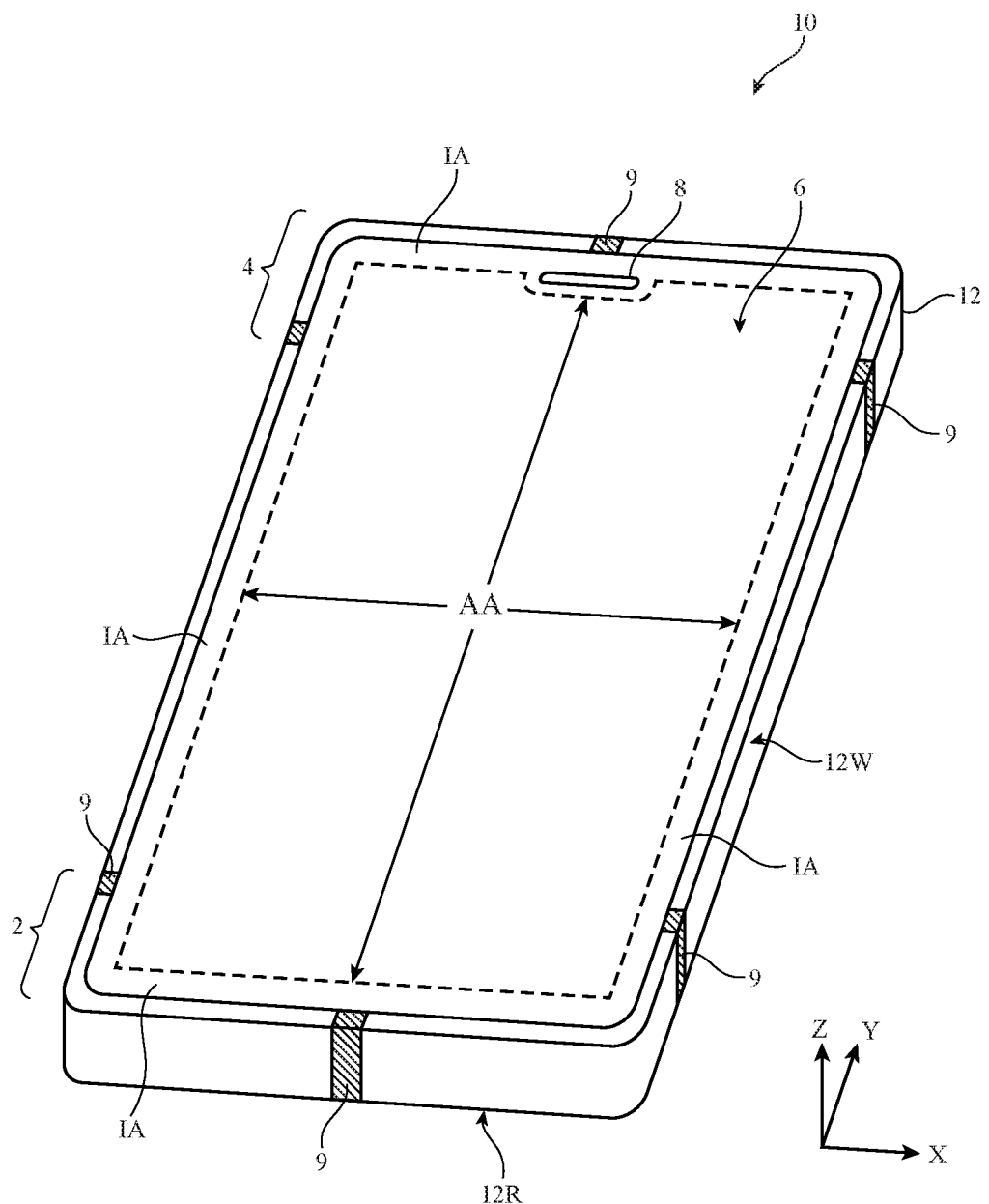
FIG. 1 is a front perspective view of an illustrative electronic device with wireless communications circuitry in accordance with an embodiment.

Electronic devices such as electronic device 10 of FIG. 1 may contain wireless circuitry. The wireless circuitry may include one or more antennas. The antennas may include phased antenna arrays that are used for handling millimeter wave and centimeter wave communications. The antennas may also include independent antennas for handling millimeter and centimeter wave communications that are not a part of a larger phased antenna array. Antennas within a given phased antenna array and independent antennas that are not a part of the phased antenna array may be distributed at different locations across the electronic device. This may allow the antennas to cover millimeter and centimeter wave communications on all sides of the electronic device (e.g., across a full sphere around the electronic device).

Independent antennas that are not part of a larger phased antenna array may fit within spaces on the electronic device that would otherwise be too small to accommodate an entire phased antenna array. The independent antennas may not be capable of offering the same gain as the phased antenna array. If desired, power amplifier circuitry may be used to boost the gain of the independent antennas. In another suitable arrangement, the independent antennas may be coupled to multiple transceiver ports to boost the gain of the independent antennas.

Millimeter wave communications, which are sometimes referred to as extremely high frequency (EHF) communications, involve signals at 60 GHz or other frequencies between about 30 GHz and 300 GHz. Centimeter wave communications involve signals at frequencies between about 10 GHz and 30 GHz. While uses of millimeter wave communications may be described herein as examples, centimeter wave communications, EHF communications, or any other types of communications may be similarly used. If desired, electronic devices may also contain wireless communications circuitry for handling satellite navigation system signals, cellular telephone signals, local wireless area network signals, near-field communications, light-based wireless communications, or other wireless communications.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 6. Display 6 may be mounted on the front face of device 10. Display 6 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and conductive portions of rear housing wall 12R may sometimes be referred to herein collectively as conductive structures of housing 12. Peripheral structures 12W may run around the periphery of device 10 and display 6. In configurations in which device 10 and display 6 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 6 (e.g., a cosmetic trim that surrounds all four sides of display 6 and/or that helps hold display 6 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip that helps hold display 6 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 6), peripheral conductive housing structures 12W may run around the lip of housing 12 (i.e., peripheral conductive housing structures 12W may cover only the edge of housing 12 that surrounds display 6 and not the rest of the sidewalls of housing 12).

Rear housing wall 12R may lie in a plane that is parallel to display 6. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide peripheral conductive structures 12W and/or conductive portions of rear housing wall 12R from view of the user).

Display 6 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 6 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layers in display 6 that overlaps inactive area IA may be coated with an opaque masking layer in inactive area IA. The opaque masking layer may have any suitable color.

Display 6 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10.

Openings may be formed in the display cover layer. For example, an opening may be formed in the display cover layer to accommodate a button. An opening may also be formed in the display cover layer to accommodate ports such as speaker port 8 or a microphone port. Openings may be formed in housing 12 to form communications ports (e.g., an audio jack port, a digital data port, etc.) and/or audio ports for audio components such as a speaker and/or a microphone if desired.

Display 6 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of peripheral conductive structures 12W). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 6, for example.

In regions 2 and 4, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 6, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 2 and 4 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 2 and 4. If desired, the ground plane that is under active area AA of display 6 and/or other metal structures in device 10 may have portions that extend into parts of the ends of device 10 (e.g., the ground may extend towards the dielectric-filled openings in regions 2 and 4), thereby narrowing the slots in regions 2 and 4.

In general, device 10 may include any suitable number of antennas (e.g., one or more, two or more, three or more, four or more, etc.). The antennas in device 10 may be located at opposing first and second ends of an elongated device housing (e.g., ends at regions 2 and 4 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 9, as shown in FIG. 1. The gaps in peripheral conductive housing structures 12W may be filled with dielectric such as polymer, ceramic, glass, air, other dielectric materials, or combinations of these materials. Gaps 9 may divide peripheral conductive housing structures 12W into one or more peripheral conductive segments. There may be, for example, two peripheral conductive segments in peripheral conductive housing structures 12W (e.g., in an arrangement with two of gaps 9), three peripheral conductive segments (e.g., in an arrangement with three of gaps 9), four peripheral conductive segments (e.g., in an arrangement with four of gaps 9), six peripheral conductive segments (e.g., in an arrangement with six gaps 9), etc. The segments of peripheral conductive housing structures 12W that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 12W and may form antenna slots, gaps 9, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 4. A lower antenna may, for example, be formed at the lower end of device 10 in region 2. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, etc. Two or more antennas in device 10 may be arranged in a phased antenna array for covering millimeter and centimeter wave communications if desired. Independent antennas that are not arranged in a phased antenna array may also cover millimeter and centimeter wave communications if desired.

In order to provide an end user of device 10 with as large of a display as possible (e.g., to maximize an area of the device used for displaying media, running applications, etc.), it may be desirable to increase the amount of area at the front face of device 10 that is covered by active area AA of display 6. Increasing the size of active area AA may reduce the size of inactive area IA within device 10. This may reduce the area behind display 6 that is available for antennas within device 10. For example, active area AA of display 6 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

Figure 2:
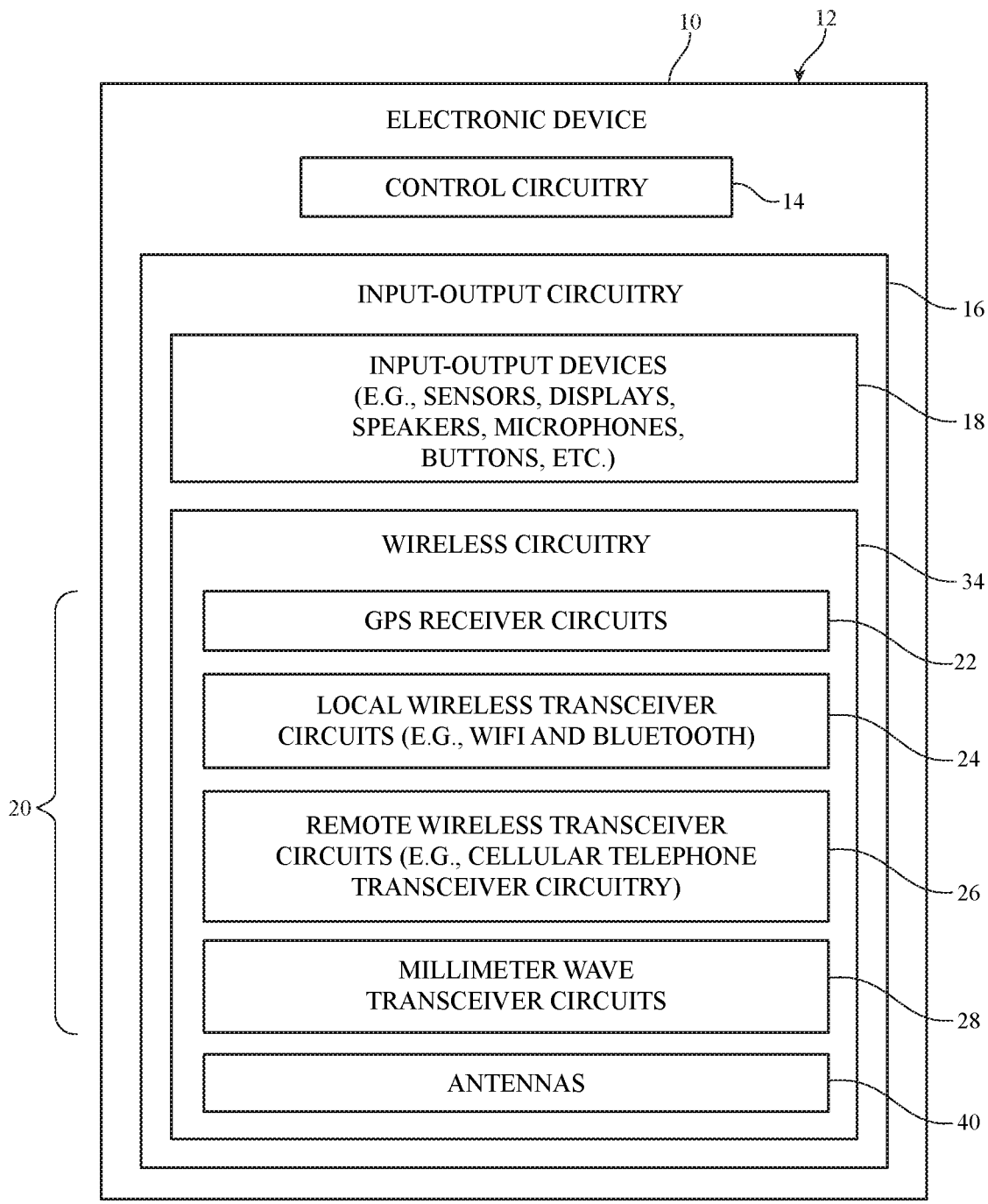
FIG. 2 is a schematic diagram of an illustrative electronic device with wireless communications circuitry in accordance with an embodiment.

FIG. 2 is a schematic diagram showing illustrative components that may be used in an electronic device such as electronic device 10. As shown in FIG. 2, device 10 may include storage and processing circuitry such as control circuitry 14. Control circuitry 14 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, baseband processor integrated circuits, application specific integrated circuits, etc.

Control circuitry 14 may be used to run software on device 10, such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other wireless personal area network protocols, IEEE 802.11ad protocols, cellular telephone protocols, MIMO protocols, antenna diversity protocols, satellite navigation system protocols, etc.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 20 for handling various radio-frequency communications bands. For example, circuitry 34 may include transceiver circuitry 22, 24, 26, and 28.

Transceiver circuitry 24 may be wireless local area network transceiver circuitry. Transceiver circuitry 24 may handle 2.4 GHz and 5 GHz bands for Wi-Fi® (IEEE 802.11) communications or other wireless local area network (WLAN) bands and may handle the 2.4 GHz Bluetooth® communications band or other wireless personal area network (WPAN) bands.

Circuitry 34 may use cellular telephone transceiver circuitry 26 for handling wireless communications in frequency ranges such as a low communications band from 600 to 960 MHz, a midband from 1710 to 2170 MHz, a high band from 2300 to 2700 MHz, an ultra-high band from 3400 to 3700 MHz, or other communications bands between 600

MHz and 4000 MHz or other suitable frequencies (as examples). Circuitry 26 may handle voice data and non-voice data.

Millimeter wave transceiver circuitry 28 (sometimes referred to as extremely high frequency (EHF) transceiver circuitry 28 or transceiver circuitry 28) may support communications at frequencies between about 10 GHz and 300 GHz. For example, transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, circuitry 28 may support IEEE 802.11ad communications at 60 GHz and/or 5th generation mobile networks or 5th generation wireless systems (5G) communications bands between 27 GHz and 90 GHz. If desired, circuitry 28 may support communications at multiple frequency bands between 10 GHz and 300 GHz such as a first band from 27.5 GHz to 28.5 GHz, a second band from 37 GHz to 41 GHz, and a third band from 57 GHz to 71 GHz, or other communications bands between 10 GHz and 300 GHz. Circuitry 28 may be formed from one or more integrated circuits (e.g., multiple integrated circuits mounted on a common printed circuit in a system-in-package device, one or more integrated circuits mounted on different substrates, etc.). While circuitry 28 is sometimes referred to herein as millimeter wave transceiver circuitry 28, millimeter wave transceiver circuitry 28 may handle communications at any desired communications bands at frequencies between 10 GHz and 300 GHz (e.g., transceiver circuitry 28 may transmit and receive radio-frequency signals in millimeter wave communications bands, centimeter wave communications bands, etc.).

Wireless communications circuitry 34 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry 28 may convey signals that travel (over short distances) between a transmitter and a receiver over a line-of-sight path. To enhance signal reception for millimeter and centimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, stacked patch antenna structures, antenna structures having parasitic elements (e.g., patch antennas having one or more patch antenna resonating elements that are overlapped by one or more cross-shaped parasitic elements), inverted-F antenna structures, slot antenna structures, planar inverted-F antenna structures, monopoles, dipoles, helical antenna structures, Yagi (Yagi-Uda) antenna structures, surface integrated waveguide structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can be arranged in phased antenna arrays for handling millimeter wave and centimeter wave communications. Independent antennas 40 that are not arranged in phased antenna arrays can also handle millimeter and centimeter wave communications if desired.

Transmission line paths may be used to route antenna signals within device 10. For example, transmission line paths may be used to couple antennas 40 to transceiver circuitry 20. Transmission line paths in device 10 may include coaxial cable paths, microstrip transmission lines, stripline transmission lines, edge-coupled microstrip transmission lines, edge-coupled stripline transmission lines, waveguide structures for conveying signals at millimeter wave frequencies (e.g., coplanar waveguides or grounded coplanar waveguides), transmission lines formed from combinations of transmission lines of these types, etc.

Transmission line paths in device 10 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 14 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40 if desired.

In some configurations, antennas 40 may include antenna arrays (e.g., phased antenna arrays to implement beam steering functions). For example, some or all of the antennas that are used in handling millimeter wave signals for extremely high frequency wireless transceiver circuits 28 may be implemented within phased antenna arrays. The radiating elements in a phased antenna array for supporting millimeter wave communications may be patch antennas, dipole antennas, Yagi (Yagi-Uda) antennas, or other suitable antenna elements. Transceiver circuitry 28 can be integrated with the phased antenna arrays to form integrated phased antenna array and transceiver circuit modules or packages (sometimes referred to herein as integrated antenna modules or antenna modules) if desired.

In devices such as handheld devices, the presence of an external object such as the hand of a user or a table or other surface on which a device is resting has a potential to block wireless signals such as millimeter wave signals. In addition, millimeter wave communications typically require a line of sight between antennas 40 and the antennas on an external device. Accordingly, it may be desirable to incorporate multiple phased antenna arrays and/or independent antennas into device 10, each of which is placed in a different location within or on device 10. With this type of arrangement, an unblocked phased antenna array may be switched into use and, once switched into use, the phased antenna array may use beam steering to optimize wireless performance. Similarly, an unblocked independent antenna may be switched into use (e.g., without performing beam steering). Similarly, if a phased antenna array does not face or have a line of sight to an external device, another phased antenna array that has line of sight to the external device may be switched into use and that phased antenna array may use beam steering to optimize wireless performance. Similarly, an independent antenna that has line of sight to the external device may be switched into use and may be provided with a boosted gain to optimize wireless performance. Configurations in which antennas from one or more different locations in device 10 are operated together may also be used (e.g., to form a single phased antenna array distributed across device 10, etc.).

Figure 3:
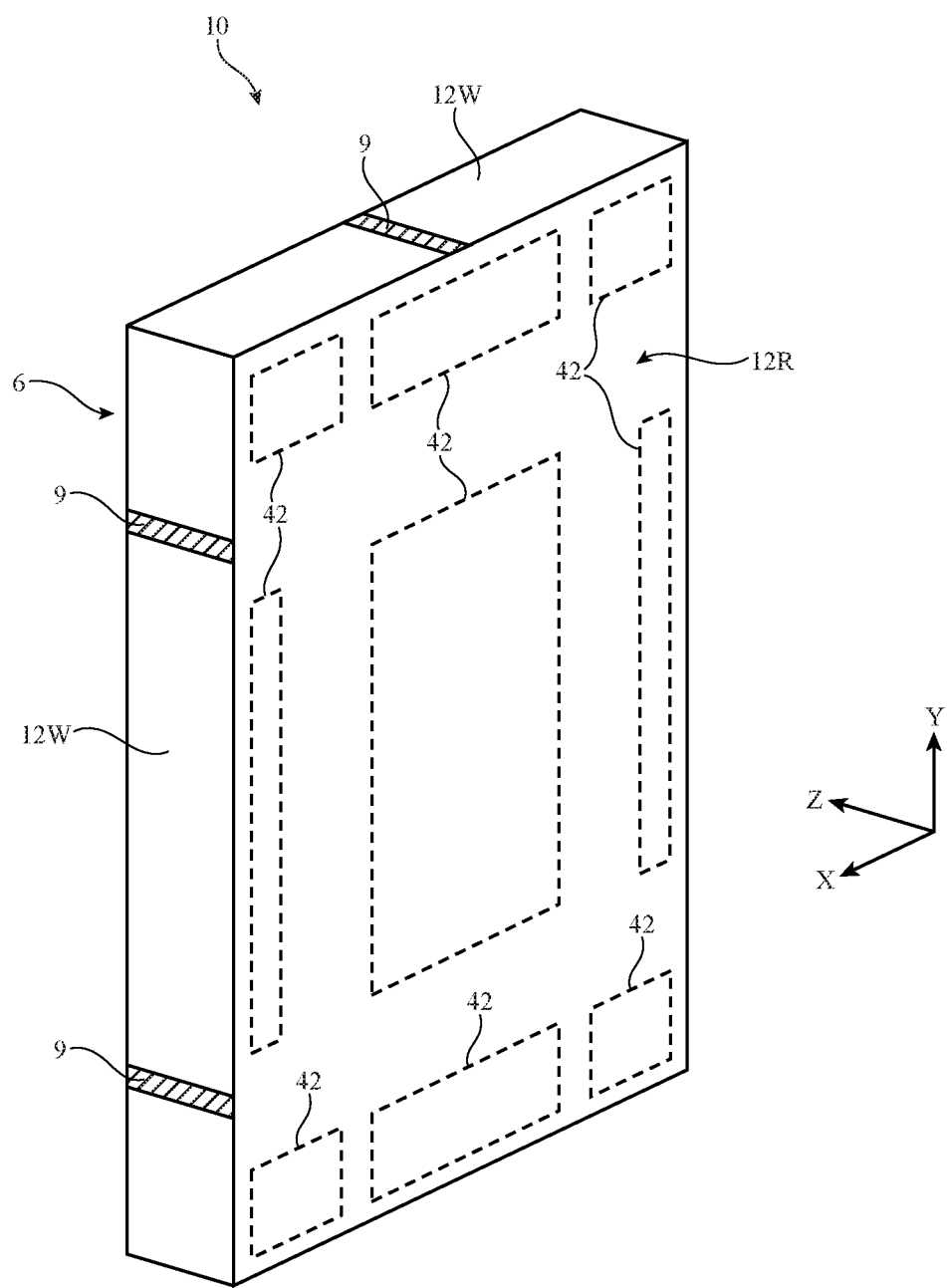
FIG. 3 is a rear perspective view of an illustrative electronic device showing illustrative locations at which antennas for millimeter and centimeter wave communications may be located in accordance with an embodiment.

FIG. 3 is a rear perspective view of electronic device 10 showing illustrative locations 42 in which antennas 40 (e.g., single independent antennas and/or phased antenna arrays for use with wireless circuitry 34 such as millimeter wave wireless transceiver circuitry 28) may be mounted in device 10. As shown in FIG. 3, antennas 40 may be mounted at the corners of device 10, along the edges of housing 12 such as peripheral conductive sidewalls 12W, on the upper and lower portions of rear housing wall 12R, in the center of rear housing wall 12R, etc.

In one suitable arrangement, rear housing wall 12R includes a substantially planar dielectric layer such as a glass, ceramic, or sapphire layer that extends across the entire rear face of device 10 (e.g., between opposing top and bottom peripheral conductive sidewalls 12W and between opposing left and right peripheral conductive sidewalls 12W). A conductive layer may extend across an interior surface of the dielectric layer and may include openings that are aligned with locations 42. Phased antenna arrays and/or independent antennas that are not a part of a phased antenna array may be aligned with these openings (e.g., at one or more locations such as locations 42 of FIG. 3) for conveying millimeter wave signals through the dielectric layer of rear housing wall 12R.

If desired, phased antenna arrays and/or independent antennas that are not a part of a phased antenna array may be mounted adjacent to peripheral conductive sidewalls 12W and may convey millimeter wave signals through gaps 9 (e.g., the phased antenna arrays and independent antennas may be aligned with gaps 9). If desired, phased antenna arrays and/or independent antennas may be mounted against display 6 and may convey radio-frequency signals through the front face of device 10 (e.g., through a dielectric cover layer for display 6). Phased antenna arrays and independent antennas mounted behind display 6 may, for example, be aligned with inactive area IA of FIG. 1 (e.g., along the left side, right side, bottom side, top side, bottom-left corner, bottom-right corner, top-right corner, and/or top-left corner of display 6 between active area AA and peripheral conductive sidewalls 12W). Any desired combinations of these locations or other locations may be used for mounting one or more phased antenna arrays that convey millimeter wave signals and/or one or more independent antennas that are not a part of a phased antenna array and that convey millimeter wave signals. Device 10 may have other shapes if desired (e.g., cylindrical shapes, shapes having curved and/or straight edges, etc.).

Figure 4:
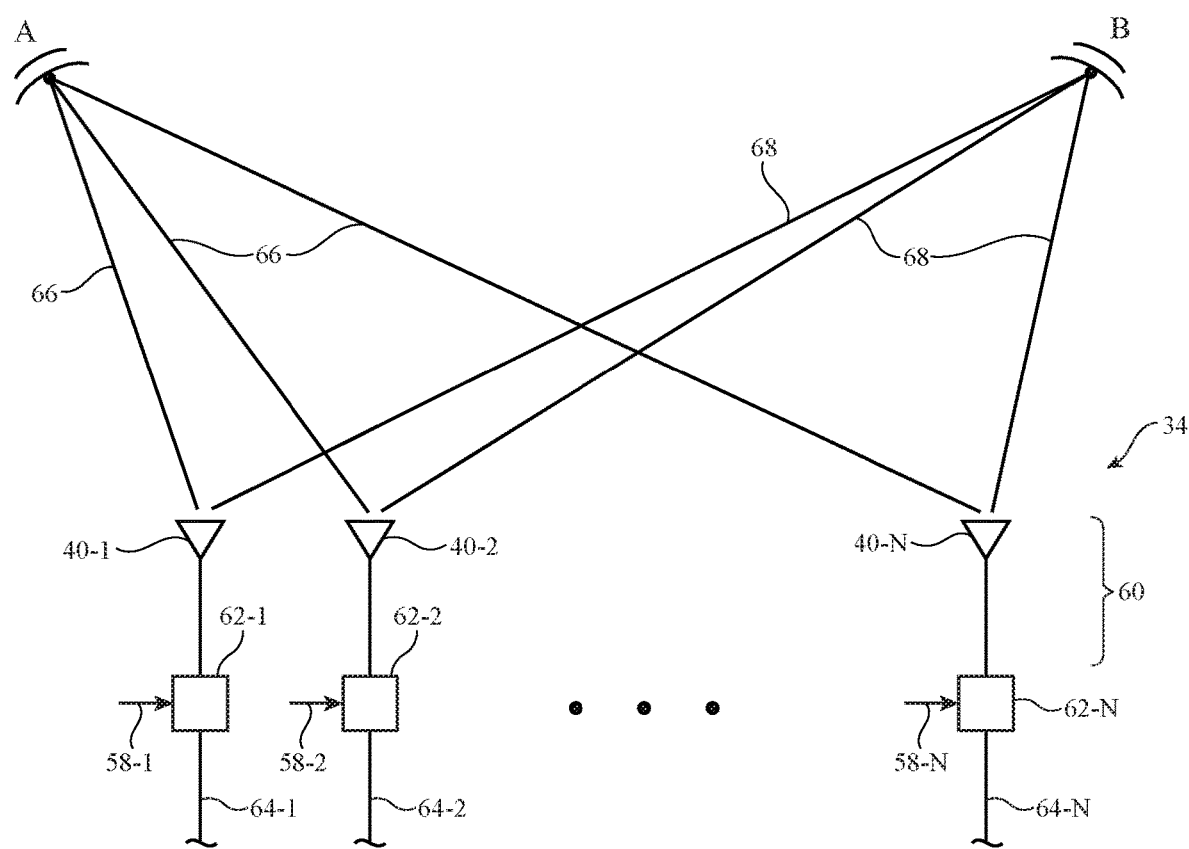
FIG. 4 is a diagram of an illustrative phased antenna array that may be adjusted using control circuitry to direct a beam of signals in accordance with an embodiment.

FIG. 4 shows how some of the antennas 40 on device 10 may be formed in a phased antenna array. As shown in FIG. 4, phased antenna array 60 (sometimes referred to herein as array 60, antenna array 60, or array 60 of antennas 40) may be coupled to signal paths such as transmission line paths 64 (e.g., one or more radio-frequency transmission lines). For example, a first antenna 40-1 in phased antenna array 60 may be coupled to a first transmission line path 64-1, a second antenna 40-2 in phased antenna array 60 may be coupled to a second transmission line path 64-2, an Nth antenna 40-N in phased antenna array 60 may be coupled to an Nth transmission line path 64-N, etc. While antennas 40 are described herein as forming a phased antenna array, the antennas 40 in phased antenna array 60 may sometimes be referred to as collectively forming a single phased array antenna.

Antennas 40 in phased antenna array 60 may be arranged in any desired number of rows and columns or in any other desired pattern (e.g., the antennas need not be arranged in a grid pattern having rows and columns). During signal transmission operations, transmission line paths 64 may be used to supply signals (e.g., radio-frequency signals such as millimeter wave and/or centimeter wave signals) from transceiver circuitry 28 (FIG. 2) to phased antenna array 60 for wireless transmission to external wireless equipment. During signal reception operations, transmission line paths 64 may be used to convey signals received at phased antenna array 60 from external equipment to transceiver circuitry 28 (FIG. 2).

The use of multiple antennas 40 in phased antenna array 60 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 62 (e.g., a first phase and magnitude controller 62-1 interposed on transmission line path 64-1 may control phase and magnitude for radio-frequency signals handled by antenna 40-1, a second phase and magnitude controller 62-2 interposed on transmission line path 64-2 may control phase and magnitude for radio-frequency signals handled by antenna 40-2, an Nth phase and magnitude controller 62-N interposed on transmission line path 64-N may control phase and magnitude for radio-frequency signals handled by antenna 40-N, etc.).

Phase and magnitude controllers 62 may each include circuitry for adjusting the phase of the radio-frequency signals on transmission line paths 64 (e.g., phase shifter circuits) and/or circuitry for adjusting the magnitude of the radio-frequency signals on transmission line paths 64 (e.g., power amplifier and/or low noise amplifier circuits). Phase and magnitude controllers 62 may sometimes be referred to collectively herein as beam steering circuitry (e.g., beam steering circuitry that steers the beam of radio-frequency signals transmitted and/or received by phased antenna array 60).

Phase and magnitude controllers 62 may adjust the relative phases and/or magnitudes of the transmitted signals that are provided to each of the antennas in phased antenna array 60 and may adjust the relative phases and/or magnitudes of the received signals that are received by phased antenna array 60 from external equipment. Phase and magnitude controllers 62 may, if desired, include phase detection circuitry for detecting the phases of the received signals that are received by phased antenna array 60 from external equipment. The term "beam" or "signal beam" may be used herein to collectively refer to wireless signals that are transmitted and received by phased antenna array 60 in a particular direction. The term "transmit beam" may sometimes be used herein to refer to wireless radio-frequency signals that are transmitted in a particular direction whereas the term "receive beam" may sometimes be used herein to refer to wireless radio-frequency signals that are received from a particular direction.

If, for example, phase and magnitude controllers 62 are adjusted to produce a first set of phases and/or magnitudes for transmitted millimeter wave signals, the transmitted signals will form a millimeter wave frequency transmit beam as shown by beam 66 of FIG. 4 that is oriented in the direction of point A. If, however, phase and magnitude controllers 62 are adjusted to produce a second set of phases and/or magnitudes for the transmitted millimeter wave signals, the transmitted signals will form a millimeter wave frequency transmit beam as shown by beam 68 that is oriented in the direction of point B. Similarly, if phase and magnitude controllers 62 are adjusted to produce the first set of phases and/or magnitudes, wireless signals (e.g., millimeter wave signals in a millimeter wave frequency receive beam) may be received from the direction of point A as shown by beam 66. If phase and magnitude controllers 62 are adjusted to produce the second set of phases and/or magnitudes, signals may be received from the direction of point B, as shown by beam 68.

Each phase and magnitude controller 62 may be controlled to produce a desired phase and/or magnitude based on a corresponding control signal 58 received from control circuitry 14 of FIG. 2 or other control circuitry in device 10 (e.g., the phase and/or magnitude provided by phase and magnitude controller 62-1 may be controlled using control signal 58-1, the phase and/or magnitude provided by phase and magnitude controller 62-2 may be controlled using control signal 58-2, etc.). If desired, control circuitry 14 may actively adjust control signals 58 in real time to steer the transmit or receive beam in different desired directions over time. Phase and magnitude controllers 62 may provide information identifying the phase of received signals to control circuitry 14 if desired.

When performing millimeter or centimeter wave communications, radio-frequency signals are conveyed over a line of sight path between phased antenna array 60 and external equipment. If the external equipment is located at location A of FIG. 4, phase and magnitude controllers 62 may be adjusted to steer the signal beam towards direction A. If the external equipment is located at location B, phase and magnitude controllers 62 may be adjusted to steer the signal beam towards direction B. In the example of FIG. 4, beam steering is shown as being performed over a single degree of freedom for the sake of simplicity (e.g., towards the left and right on the page of FIG. 4). However, in practice, the beam is steered over two or more degrees of freedom (e.g., in three dimensions, into and out of the page and to the left and right on the page of FIG. 4).

In some scenarios, separate phased antenna arrays can be mounted at both the front and rear faces of device 10. When mounted in this way, each phased antenna array may be capable of performing beam steering over a corresponding hemisphere around device 10. Collectively, the two phased antenna arrays may provide coverage within a full sphere around all sides of device 10, for example. However, phased antenna arrays such as phased antenna array 60 occupy more space than a single antenna 40. This is particularly true in scenarios where each antenna 40 in phased antenna array 60 is mounted on the same substrate such as a shared flexible or rigid printed circuit board.

Space constraints within device 10 can render the use of entire phased antenna arrays at both the front and rear faces of device 10 impractical. In practice, there may not be enough room within device 10 to mount different phased antenna arrays 60 on different sides of device 10 for covering a full sphere around the device. For example, while there may be sufficient space within device 10 to mount a phased antenna array 60 behind rear housing wall 12R (e.g., within a region 42 of FIG. 3), active area AA of display 6 can limit the available area at the front face of device 10 to the relatively narrow inactive area IA between active area AA and peripheral conductive sidewalls 12W. Inactive area IA can be too narrow to accommodate an entire N-element phased antenna array, particularly in scenarios where active area extends across substantially all of the front face of device 10.

Phased antenna array 60 may include N antennas 40 arranged within a localized region of device 10. If desired, one or more individual antennas 40 can be mounted elsewhere on device 10 for conveying millimeter wave signals. These individual antennas 40, which are sometimes referred to herein as independent antennas 40I, individual antennas 40I, or non-array antennas 40I, are mounted within regions of device 10 that are separated from phased antenna array 60 (see, e.g., independent antennas 40I-1, 40I-2, and 40I-M of FIG. 5). For example, phased antenna array 60 may be mounted within a given region 42 behind rear housing wall 12R (FIG. 3) whereas one or more independent antennas 40I are mounted within inactive region IA at the front face of device 10 (e.g., for conveying millimeter wave signals through a display cover layer for display 6) and/or behind dielectric-filled gaps 9 in peripheral conductive housing structures 12W (FIG. 1). This example is merely illustrative.

In general, independent antennas 40I and phased antenna array 60 may be mounted on opposing sides of device 10 (e.g., phased antenna array 60 may be mounted behind rear housing wall 12R whereas independent antennas 40I are mounted behind display 6) or may be mounted at any other desired locations separated by a sufficiently large distance such as a distance that is greater than approximately one, two, three, four, or more than four wavelengths of operation for the antennas. Independent antennas 40I may be non-localized within device 10 (e.g., each independent antenna 40I may be separated from each of the other independent antennas 40I by one, two, three, four, or more than four wavelengths) and/or two or more independent antennas 40I may be localized within the same region of device 10 (e.g., two or more independent antennas may be located within one wavelength of each other).

In one suitable arrangement, independent antennas 40I do not perform beam steering with any other antennas in phased antenna array 60 or with any other independent antennas 40I. For example, independent antennas 40I may be formed without corresponding phase and magnitude controller circuitry 62 (FIG. 4) and the radio-frequency signals transmitted by independent antennas 40I may not constructively interfere with radio-frequency signals transmitted by phased antenna array 60 (e.g., independent antennas 40I do not affect beam steering by phased antenna array 60).

In another suitable arrangement, one independent antenna 40I may perform beam steering with one or more other independent antennas 40I. For example, each independent antenna 40I may be coupled to corresponding phase and magnitude controller circuitry 62 (FIG. 4) and the radio-frequency signals transmitted by independent antennas 40I may constructively interfere to steer a corresponding beam in a particular direction (e.g., a different beam than that transmitted by phased antenna array 60). If desired, each independent antenna 40I may be mounted at a different location across device 10 (e.g., locations that are separated by one, two, three, four, or more than four wavelengths of operation of independent antennas 40I). In this example, independent antennas 40I may effectively form a phased antenna array that steers a beam of radio-frequency signals using individual antennas distributed across different locations on device 10. If desired, two or more independent antennas 40I may be mounted within the same region of device 10. In this example, independent antennas 40I may effectively form a phased antenna array that steers a beam of radio-frequency signals using antennas that are separate from phased antenna array 60 but that are localized within a given region of device 10. Combinations of these arrangements may be used if desired (e.g., two or more localized independent antennas 40I may form a phased antenna array with one or more independent antennas 40I located elsewhere on device 10).

In yet another suitable arrangement, one or more independent antennas 40I include phase and magnitude controller circuitry (e.g., phase and magnitude controller circuitry 62 of FIG. 4) that configures the antennas to serve as a part of the same phased antenna array as the antennas 40 in phased antenna array 60, even though independent antennas 40I are not mounted within the localized region occupied by the rest of the antennas in phased antenna array 60. For example, phase and magnitude controller circuitry may adjust the phase and magnitude of the radio-frequency signals conveyed by independent antennas 40I to constructively interfere with the radio-frequency signals conveyed by phased antenna array 60 to steer a beam of radio-frequency signals formed by independent antennas 40I and phased antenna array 60 in a particular direction. In these scenarios, independent antennas 40I and phased antenna array 60 both form part of a single larger phased antenna array that includes phased antenna array 60 and independent antennas 40I.

Each independent antenna 40I has a smaller footprint than the N-element phased antenna array 60. This may allow independent antennas 40I to be mounted at a greater variety of locations within device 10 than phased antenna array 60. For example, independent antennas 40I may be mounted within inactive area IA of display 6 (FIG. 1), in alignment with gaps 9 in peripheral conductive housing structures 12W, between device components that would otherwise be too large to accommodate an N-element entire array, etc.

While phased antenna array 60 may perform beam steering over a relatively large solid angle around device 10 (e.g., within an entire hemisphere over device 10), independent antennas 40I may each be incapable of covering the same solid angle as phased antenna arrays 60 (e.g., independent antennas 40I may be incapable of performing any beam steering in scenarios where independent antennas 40I do not include phase and magnitude controller circuitry or in scenarios where independent antennas 40I do not form part of a larger phased antenna array). However, by mounting a sufficient number of independent antennas 40I across a sufficient number of locations on device 10 (e.g., at multiple locations across inactive area IA of display 6 of FIG. 1), independent antennas 40I may be able to cover a substantial solid angle around device 10. When combined with the coverage area of phased antenna array 60, the solid angles covered by each independent antenna 40I may allow wireless communications circuitry 34 to cover almost an entire sphere around device 10, for example. In this way, device 10 may perform millimeter and centimeter wave communications across approximately all of the sphere around device 10 despite the limited amount of space available within device 10.

In addition, each antenna 40 in phased antenna array 60 contributes to the overall gain of phased antenna array 60. This may allow phased antenna array 60 to exhibit sufficient gain to counteract the relatively high over-the-air attenuation associated with frequencies greater than 10 GHz (e.g., as the radio-frequency signals transmitted by phased antenna array 60 propagate along a line of sight path to external communications equipment). However, in practice, independent antennas 40I may not exhibit the high gain afforded by forming the antennas within a phased antenna array. It would therefore also be desirable to be able to provide independent antennas 40I with sufficient gain to compensate for signal attenuation along a line of sight path to external communications equipment.

Figure 5:
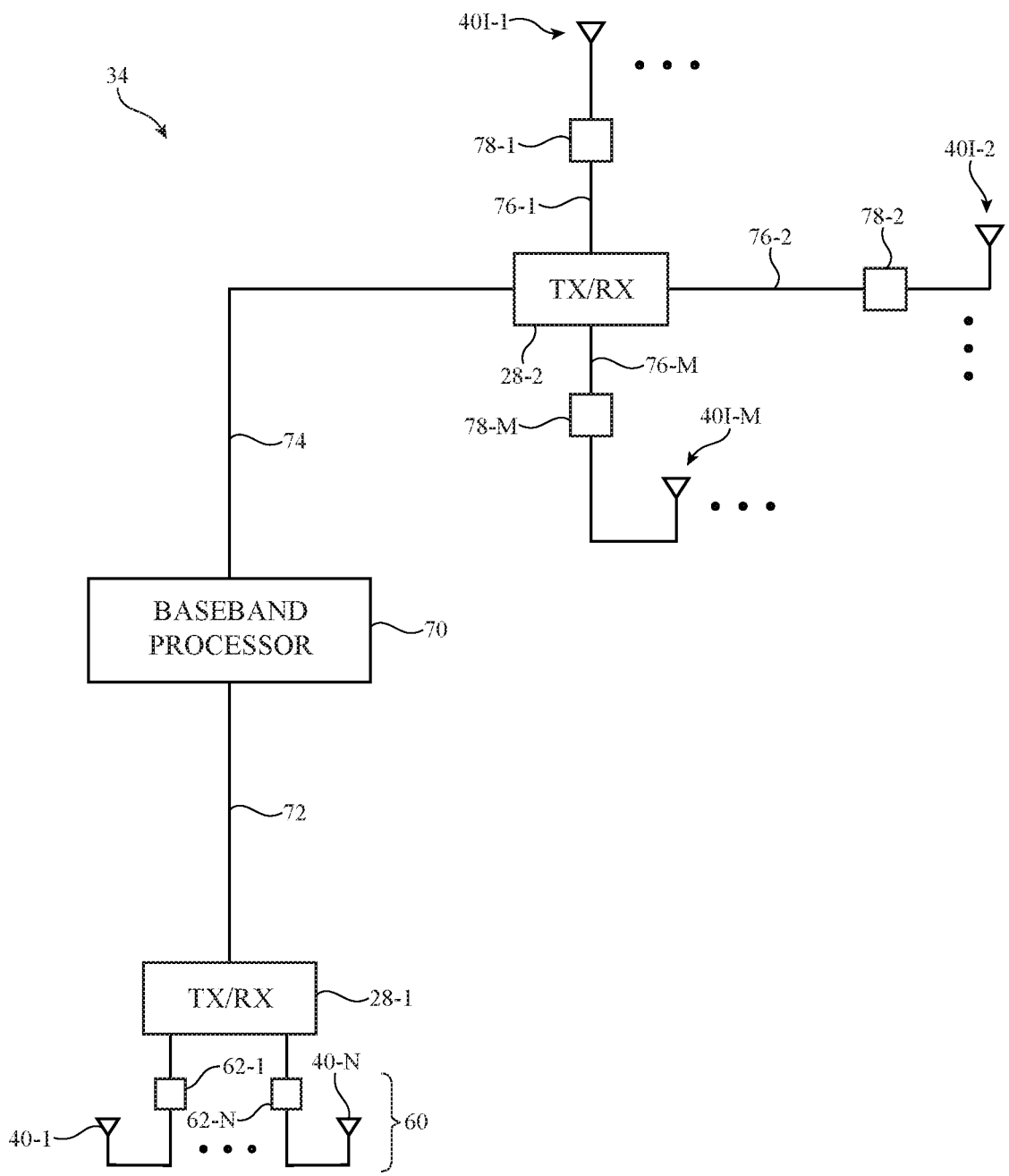
FIG. 5 is a diagram showing how an illustrative phased antenna array and other antennas may be coupled to respective transceivers for providing millimeter and centimeter wave coverage on all sides of an electronic device in accordance with an embodiment.

In one suitable arrangement, independent antennas 40I and phased antenna array 60 may be coupled to separate radio-frequency transceivers in device 10. FIG. 5 is diagram showing how independent antennas 40I and phased antenna array 60 may be coupled to separate radio-frequency transceivers.

As shown in FIG. 5, wireless communications circuitry 34 may include baseband processor circuitry such as baseband processor 70 and multiple millimeter wave transceivers 28 such as a first transceiver (TX/RX) 28-1 and a second transceiver 28-2. Transceivers 28-1 and 28-2 may, for example, be formed from separate integrated circuits, chips, or integrated circuit packages. Transceivers 28-1 and 28-2 may be mounted at different locations within device 10 (e.g., transceiver 28-1 may be mounted within region 4 of device 10 whereas transceiver 28-2 is mounted within region 2 of device 10 as shown in FIG. 1, transceiver 28-1 may be mounted at or against rear housing wall 12R of FIG. 3 whereas transceiver 28-2 is mounted at or against display 6 of FIG. 1, etc.). If desired, transceivers 28-1 and 28-2 may be mounted to separate substrates such as separate flexible or rigid printed circuit boards.

Baseband processor 70 may receive digital data from an applications processor (e.g., control circuitry 14 of FIG. 2) or from other circuitry. Baseband processor 70 may generate corresponding baseband data. Baseband processor 70 may provide the baseband data to transceiver 28-1 over path 72 and to transceiver 28-2 over path 74. If desired, baseband processor 70 may include up-converter circuitry that up-converts the baseband signals to intermediate frequencies before conveying the signals over paths 72 and 74 (e.g., frequencies between baseband frequencies and 10 GHz). Transceivers 28-1 and 28-2 may include up-converter circuitry (e.g., mixer circuitry) that up-converts the signals received from baseband processor 70 to radio-frequencies (e.g., to centimeter and millimeter wave frequencies greater than 10 GHz) before conveying the radio-frequency signals to corresponding antennas 40. Transceivers 28-1 and 28-2 may include analog-to-digital converter circuitry, digital-to-analog converter circuitry, down-converter circuitry, power amplifier circuitry, low noise amplifier circuitry, or other circuitry associated with the transmission and reception of radio-frequency signals using antennas 40.

Transceiver 28-1 may transmit and receive radio-frequency signals using phased antenna array 60. Each of the N antennas 40 in phased antenna array 60 may contribute to the overall gain of the radio-frequency signals conveyed by phased antenna array 60 (e.g., the gain of phased antenna array 60 is proportional to the number N of antennas 40 in phased antenna array 60). Transceiver 28-2 may be coupled to one or more independent antennas 40I (e.g., a number M of independent antennas 40I) over corresponding transmission line paths 76 (e.g., transceiver 28-2 may be coupled to a first independent antenna 40I-1 over path 76-1, a second independent antenna 40I-2 over path 76-2, an Mth independent antenna 40I-M over path 76-M, etc.). Transceiver 28-2 may transmit and receive radio-frequency signals using independent antennas 40I (e.g., without performing beam steering).

Independent antennas 40I may each exhibit less overall gain than phased antenna array 60. In order to help boost the gain of independent antennas 40I (e.g., to help to counteract signal attenuation for the radio-frequency signals transmitted by independent antennas 40I), front end circuits 78 may be interposed on paths 76 (e.g., a first front end circuit 78-1 may be interposed on path 76-1, a second front end circuit 78-2 may be interposed on path 76-2, an Mth front end circuit 78-M may be interposed on path 76-M, etc.). Front end circuits 78 may include power amplifier circuitry that serves to boost the gain of the radio-frequency transmitted signals for independent antennas 40I. Power amplifier circuitry in front end circuits 78 may, for example, boost the gain of independent antennas 40I beyond that of each respective antenna 40 in phased antenna array 60 (e.g., the transmit power level of radio-frequency signals transmitted by independent antennas 40I may be greater than the transmit power level of radio-frequency signals transmitted by each respective antenna 40 in phased antenna array 60). In this way, independent antennas 40I may exhibit sufficient gain to counteract over the air attenuation despite not being formed as a part of phased antenna array 60.

Independent antennas 40I such as independent antennas 40I-1, 40I-2, and 40I-M may be mounted at locations within device 10 that are otherwise too small to accommodate phased antenna array 60. As one example, antennas 40I-1, 40I-2, and 40I-M may be located at three different corners of display 6 of FIG. 1 (e.g., within inactive area IA) and may convey radio-frequency signals through the display cover layer for display 6, whereas phased antenna array 60 is mounted within a given region 42 behind rear housing wall 12R for conveying radio-frequency signals through rear housing wall 12R (FIG. 3). In this example, phased antenna array 60 may perform beam steering over the hemisphere behind device 10 whereas independent antennas 40I-1, 40I-2, and 40I-M collectively contribute coverage across a substantial portion of the hemisphere in front of device 10. In this way, phased antenna array 60 and independent antennas 40I may provide coverage with sufficient gain over a solid angle that approximates a sphere around device 10 despite the limited amount of space within device 10.

This example is merely illustrative and, in general, independent antennas 40I and phased antenna array 60 may be mounted at any desired locations within device 10. Any desired number of independent antennas 40I may be used. More than one phased antenna array 60 may be coupled to transceiver 28-1. Additional transceivers may be coupled to baseband processor 70. Additional phased antenna arrays and/or additional independent antennas 40I may be coupled to the additional transceiver(s). Multiple independent antennas 40I coupled to transceiver 28-2 (e.g., through the same front end circuit 78 or through separate front end circuits 78) may form a phased antenna array (e.g., a phased antenna array separate from phased antenna array 60) and may transmit a corresponding beam of radio-frequency signals. One or more independent antennas 40I may be provided with a selected phase and magnitude to contribute to the beam of radio-frequency signals transmitted by phased antenna array 60 (e.g., in scenarios where independent antennas 40I and phased antenna array 60 form part of a larger distributed phased antenna array). Front end circuits 78 may include other components if desired.

Figure 6:
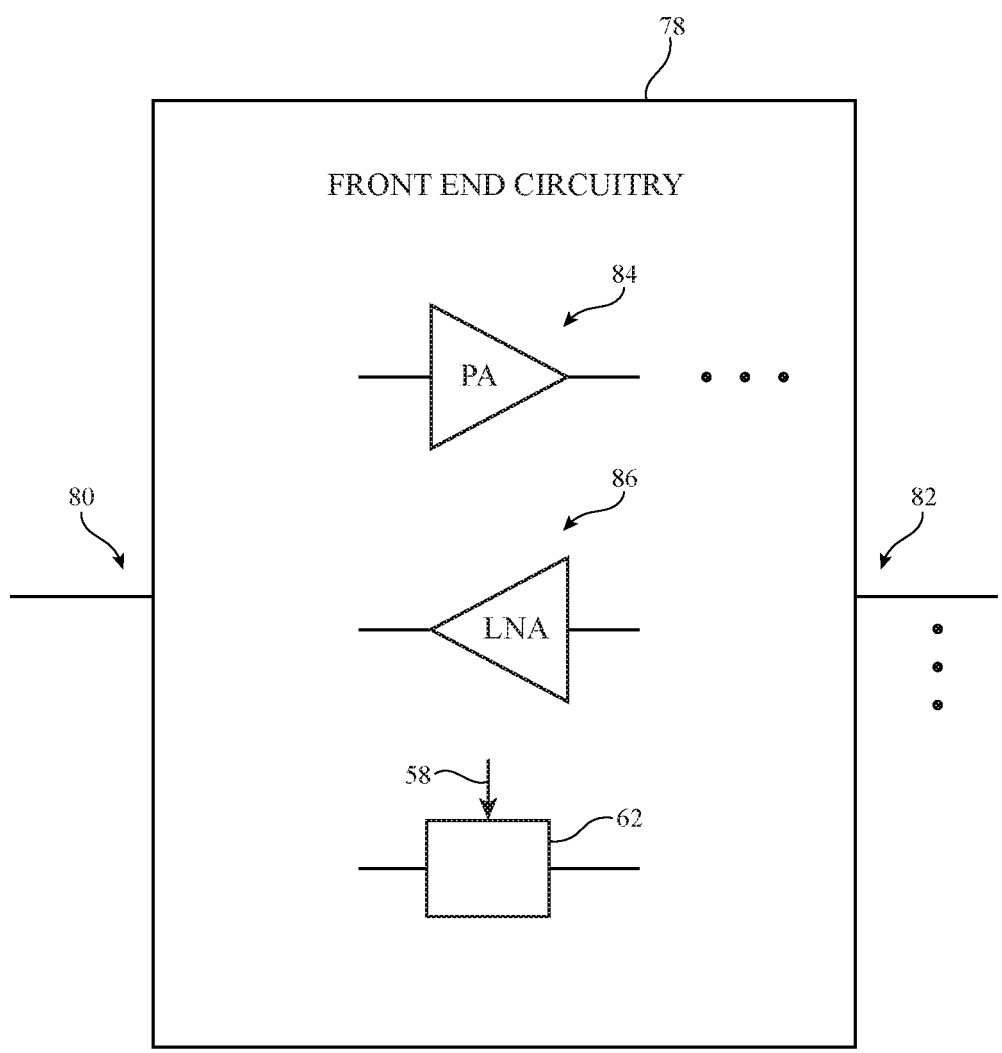
FIG. 6 is a diagram of illustrative front end circuitry that may be coupled to antennas of the type shown in FIG. 5 in accordance with an embodiment.

FIG. 6 is a diagram showing components that may be formed in front end circuits 78 of FIG. 5. As shown in FIG. 6, a given front end circuit 78 includes an input port 80 and an output port 82. Input port 80 may be coupled to transceiver 28-2 whereas output port 82 is coupled to a corresponding independent antenna 40I. If desired, front end circuit 78 may include multiple output ports 82 that are each coupled to respective independent antennas 40I (e.g., in scenarios where multiple independent antennas 40I form a phased antenna array).

Front end circuit 78 may include one or more power amplifiers 84 coupled between input port 80 and output port 82. Power amplifiers 84 may include multiple stages of power amplifiers (e.g., at least two power amplifiers coupled in series) in one suitable arrangement. There may be, for example, more power amplifiers coupled in the transmit paths between baseband processor 70 and each independent antenna 40I than in the transmit paths between baseband processor 70 and each antenna 40 in phased antenna array 60 (e.g., the radio-frequency signals transmitted by transceiver 28-2 of FIG. 5 may pass through a greater number of power amplifiers prior to transmission by a given independent antenna 40I than the radio-frequency signals transmitted by transceiver 28-1 prior to transmission by a given antenna 40 in phased antenna array 60). Control circuitry 14 (FIG. 2) may actively adjust the gain of power amplifiers 84 if desired. Power amplifiers 84 may help to counteract signal attenuation for independent antennas 40I (e.g., because independent antennas 40I may not be formed as a part of a phased antenna array in some scenarios).

Front end circuit 78 may include one or more low noise amplifiers 86 coupled between output port 82 and input port 80. Low noise amplifiers 86 may amplify radio-frequency signals received by independent antennas 40I. If desired, front end circuit 78 may include one or more phase and magnitude controllers 62. Control circuitry 14 (FIG. 2) may provide control signals 58 to control the phase and magnitude provided by phase and magnitude controller 62 (e.g., to transmit radio-frequency signals using the independent antenna(s) 40I coupled to front end circuit 78 with a desired phase and magnitude for contributing to a radio-frequency signal beam with other independent antennas 40I and/or with phased antenna array 60).

The example of FIG. 6 is merely illustrative. In general, front end circuit 78 may include any desired amplifier circuitry, filter circuitry, phase shifter circuitry, switching circuitry, matching circuitry, or any other desired radio-frequency components.

In another suitable arrangement, additional power amplifiers such as power amplifiers 84 of FIG. 6 may be omitted. In these arrangements, independent antennas 40I may be coupled to multiple transceiver ports to help recover the gain that is lost by forming independent antennas 40I separately from phased antenna array 60.

Figure 7:
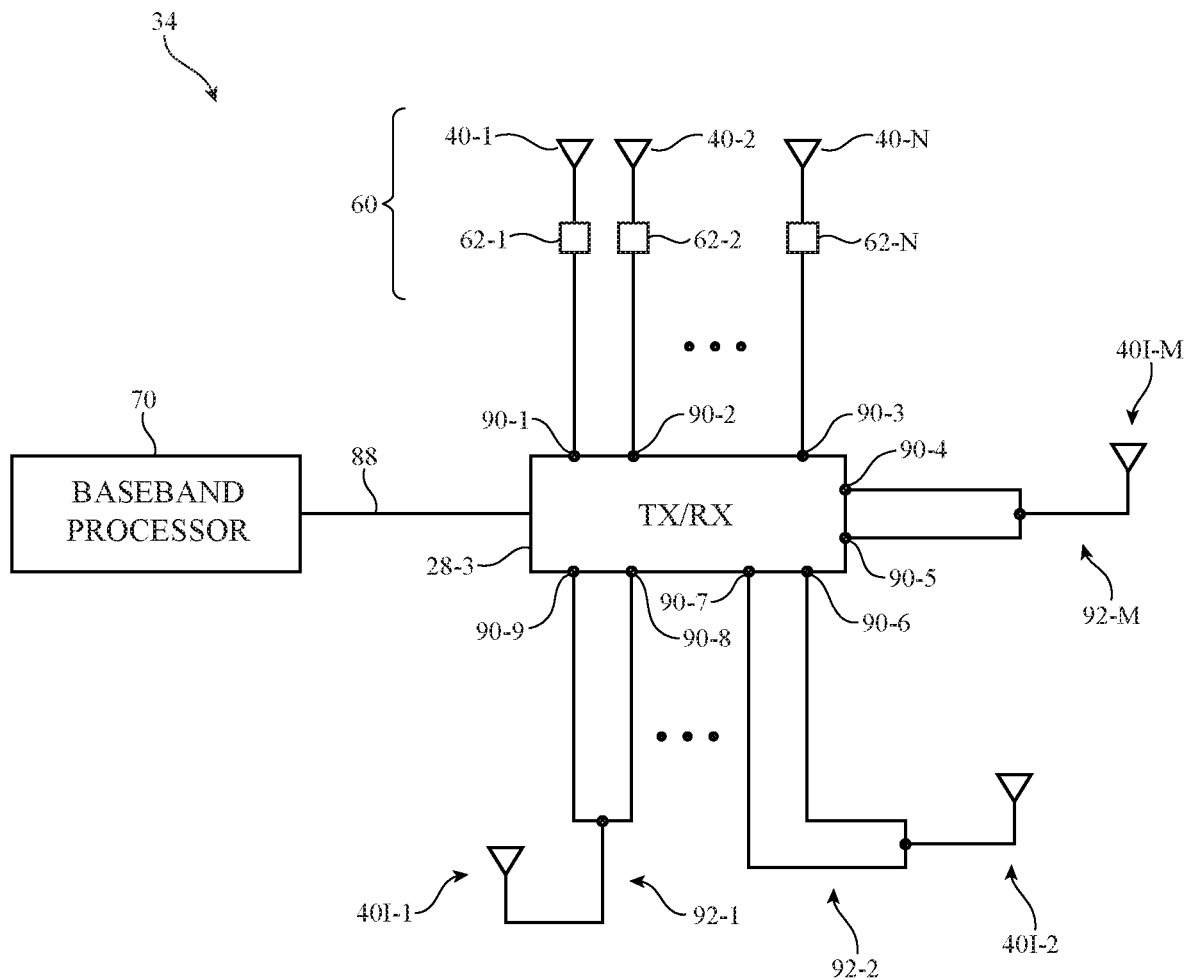
FIG. 7 is a diagram showing how an illustrative transceiver may be coupled to a phased antenna array and may include multiple ports coupled to individual antennas in accordance with an embodiment.

FIG. 7 is a diagram showing how independent antennas 40I may be coupled to multiple transceiver ports. As shown in FIG. 7, baseband processor 70 may be coupled to a millimeter wave transceiver 28 such as transceiver 28-3 over path 88. Transceiver 28-3 may include a number of radio-frequency ports 90 (e.g., a first port 90-1, a second port 90-2, a third port 90-3, etc.). Ports 90 may sometimes be referred to herein as transceiver ports 90 or output ports 90 of transceiver 28-3. Phased antenna array 60 may be coupled to a first set of ports 90 such as ports 90-1, 90-2, and 90-3. In another suitable arrangement, phased antenna array 60 may be coupled to a single port 90.

Each independent antenna 40I may be coupled to a respective pair of ports 90 over a corresponding path 92. In the example of FIG. 7, independent antenna 40I-1 is coupled to ports 90-9 and 90-8 over path 92-1, independent antenna 40I-2 is coupled to ports 90-7 and 90-6 over path 92-2, and independent antenna 40I-M is coupled to ports 90-5 and 90-4 over path 92-M. Each path 92 may, for example, include a radio-frequency transmission line. The radio-frequency transmission line may be coupled to a given antenna feed on the corresponding independent antenna 40I. For example, the radio-frequency transmission line may include a signal conductor coupled to a positive antenna feed terminal on an antenna resonating element (e.g., a patch antenna resonating element) of independent antenna 40I and may include a ground conductor coupled to a ground antenna feed terminal on an antenna ground of independent antenna 40I. The radio-frequency transmission line may include two branches that are both coupled to the antenna feed. Each branch may be coupled to a respective port 90 of transceiver 28-3.

If desired, independent antennas 40I may each include more than one antenna feed. For example, independent antenna 40I may include a first antenna feed for handling radio-frequency signals of a first polarization (e.g., a vertical polarization) and a second antenna feed for handling radio-frequency signals of a second polarization (e.g., a horizontal polarization). The first and second antenna feeds may also allow independent antenna 40I to convey radio-frequency signals with circular or elliptical polarizations. The first antenna feed may include a first positive antenna feed terminal coupled to the antenna resonating element of independent antenna 40I and a first ground antenna feed terminal coupled to the antenna ground of independent antenna 40I. The second antenna feed may include a second positive antenna feed terminal coupled to the antenna resonating element and a second ground antenna feed terminal coupled to the antenna ground of independent antenna 40I. Each antenna feed may be coupled to a respective pair of ports 90 on transceiver 28-3 over a corresponding path 92. For example, a first path 92 may be coupled to the first antenna feed on antenna 40I and may include two branches that couple the first antenna feed to a first pair of ports 90. Similarly, a second path 92 may be coupled to the second antenna feed and may include two branches that couple the second antenna feed to a second pair of ports 90. In this way, each polarization may be provided with a boost in gain using multiple ports 90 of transceiver 28-3.

Amplifier circuitry in transceiver 28-3 may output radio-frequency signals with the same output power level (amplitude) at each port 90. For example, radio-frequency signals may be transmitted from port 90-1 with amplitude A, may be transmitted from port 90-2 with amplitude A, may be transmitted from port 90-9 with amplitude A, may be transmitted from port 90-8 with amplitude A, etc. In this way, the radio-frequency signals transmitted by each antenna 40 in phased antenna array 60 has an amplitude A (e.g., before adjustments by phase and magnitude controller 62).

The radio-frequency signals transmitted by each port 90 coupled to independent antennas 40I may be combined with the radio-frequency signals transmitted by another port 90 to produce radio-frequency signals having an amplitude greater than A for each independent antenna 40I. For example, the radio-frequency signals transmitted by port 90-9 may have an amplitude A and the radio-frequency signals transmitted by port 90-8 may have an amplitude A. These radio-frequency signals may combine to generate a combined signal having an amplitude that is greater than A when transmitted by independent antenna 40I-1 (e.g., a radio-frequency signal having amplitude of A+3 dB). This may serve to effectively boost the gain of independent antennas 40I (e.g., to compensate for over-the-air signal attenuation) without requiring additional power amplifiers such as power amplifiers 84 of FIG. 6. Using a shared transceiver 28-3 for phased antenna array 60 and independent antennas 40I and omitting additional power amplifiers 84 (FIG. 6) may serve to reduce power consumption, manufacturing complexity, manufacturing cost, and space for wireless communications circuitry 34 relative to the arrangement of FIG. 5, for example.

The example of FIG. 7 is merely illustrative. In general, any desired number of independent antennas 40I may be used. More than one phased antenna array 60 may be coupled to transceiver 28-3. Phased antenna array 60 may be coupled to a separate transceiver if desired. Additional transceivers may be coupled to baseband processor 70. Additional phased antenna arrays and/or additional independent antennas 40I may be coupled to the additional transceiver(s). Front end circuits including filter circuitry, switching circuitry, low noise amplifier circuitry, and/or other radio-frequency circuitry may be interposed on paths 92 if desired. In this way (e.g., using the arrangements of FIGS. 5-7), device 10 may be provided with millimeter wave coverage across as large a solid angle as possible (e.g., across approximately all of a sphere around device 10) with sufficient gain despite the presence of a relatively large active area AA for display 6 and/or other device components within housing 12.

The foregoing is merely illustrative and various modifications can be made to the described embodiments. The foregoing embodiments may be implemented individually or in any combination.

What is claimed is:

1. An electronic device comprising:
a baseband processor configured to generate data;
a first transceiver coupled to the baseband processor over a first path and configured to generate first radio-frequency signals greater than 10 GHz based on the data;
a second transceiver coupled to the baseband processor over a second path that is separate from the first path, the second transceiver being configured to generate second radio-frequency signals greater than 10 GHz based on the data, wherein the second transceiver has first and second output ports;
a phased antenna array coupled to the first transceiver and configured to transmit the first radio-frequency signals over a steerable signal beam; and
an antenna coupled to the second transceiver and configured to transmit the second radio-frequency signals, wherein the antenna has an antenna feed coupled to both the first and second output ports.

2. The electronic device defined in claim 1, wherein the antenna is not part of any phased antenna array.

3. The electronic device defined in claim 1, further comprising:
a housing having opposing first and second faces;
a display having a display cover layer mounted at the first face; and
a dielectric layer mounted at the second face, wherein the phased antenna array is mounted within the housing and configured to transmit the first radio-frequency signals through the dielectric layer, and the antenna is mounted within the housing and configured to transmit the second radio-frequency signals through the display cover layer.

4. The electronic device defined in claim 3, wherein the housing comprises peripheral conductive housing structures that surround a periphery of the electronic device, and the display comprises an active area configured to emit light through the display cover layer and an inactive area interposed between the active area and the peripheral conductive housing structures, the antenna being aligned with the inactive area of the display.

5. The electronic device defined in claim 3, further comprising:
a power amplifier coupled to the second transceiver and configured to amplify the second radio-frequency signals; and
an additional antenna coupled to the power amplifier, wherein the additional antenna is configured to transmit the second radio-frequency signals amplified by the power amplifier through the display cover layer.

6. The electronic device defined in claim 1, wherein the antenna is separate from the phased antenna array and is configured to transmit the second radio-frequency signals separately from the steerable signal beam.

7. The electronic device defined in claim 1, wherein the electronic device has a first side and a second side opposite to the first side, the antenna is mounted at the first side of the electronic device, and the phased antenna array is mounted at the second side of the electronic device.

8. The electronic device defined in claim 1, wherein the electronic device comprises a greater number of power amplifiers coupled between the second transceiver and the antenna than between the first transceiver and any one of the antennas in the phased antenna array.

9. The electronic device defined in claim 1, further comprising:
a power amplifier and a phase and magnitude controller each coupled between the second transceiver and the antenna, wherein the phase and magnitude controller is separate from the power amplifier, and the second transceiver is configured to transmit the second radio-frequency signals over the steerable signal beam.

10. The electronic device defined in claim 1, wherein the first transceiver is formed on a first integrated circuit and the second transceiver is formed on a second integrated circuit that is separate from the first integrated circuit.

11. An electronic device having opposing first and second faces, the electronic device comprising:
peripheral conductive housing structures surrounding a periphery of the electronic device;
a display comprising a display cover layer mounted to the peripheral conductive housing structures at the first face of the electronic device, an active area configured to emit light through the display cover layer, and an inactive area interposed between the active area and the peripheral conductive housing structures;
a dielectric layer at the rear face of the electronic device;
an integrated circuit having a radio-frequency transceiver with a first output port, a second output port, and a set of output ports that are separate from the first and second output ports;
a phased antenna array coupled to the set of output ports and configured to transmit a steerable beam of first radio-frequency signals greater than 10 GHz through the dielectric layer; and
an antenna aligned with the inactive area and having an antenna feed coupled to both the first and second output ports, wherein the antenna feed is configured to receive second radio-frequency signals greater than 10 GHz from the first and second output ports and the antenna is configured to transmit the second radio-frequency signals through the display cover layer.

* * * * *